Aug. 4, 1942.  J. H. McNABB  2,291,821
LENS CAP
Filed April 10, 1940

INVENTOR
JOSEPH H. McNABB
BY Robert F. Miehle
ATTY.

Patented Aug. 4, 1942

2,291,821

UNITED STATES PATENT OFFICE 2,291,821

LENS CAP

Joseph H. McNabb, Winnetka, Ill., assignor to The Bell & Howell Company, Chicago, Ill., a corporation of Illinois Application April 10, 1940, Serial No. 328,914

2 Claims. (Cl. 88—1)

My invention relates to lens caps such as are placed over the exposed ends of photographic camera lenses to protect the same and has for one object the provision of a novel and effective lens cap which is secured so that it cannot be misplaced and can be readily engaged on or removed from a lens, the invention contemplating a novel and effective securing structure and the formation of the cap from a single piece of elastic material.

A further object resides in the provision of a lens cap provided with means for indicating to the user of a photographic camera that the lens cap is capping the lens to the end that the camera is not operated with the lens capped.

With these objects in view my invention consists in certain features of novelty in the construction, combination and arrangement of parts by which the said objects and certain other objects, hereinafter appearing, are effected, all as fully described with reference to the accompanying drawing and more particularly pointed out in the appended claims.

Figure 1:
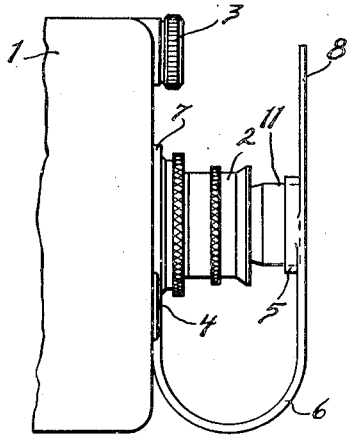
Figure 1 is a partial side elevation of a photographic motion picture camera equipped with a lens cap embodying my invention.

Referring to the drawing, 1 designates a motion picture camera provided with a usual forwardly projecting photographic lens 2, a view finder 3 arranged in adjacent parallelism with the lens, and a usual manually actuated exposure control member 4 arranged on the front of the camera adjacent the lens.

The lens cap of my invention is preferably formed of a single piece of molded lineally elastic material, such as rubber, and comprises a cup shaped capping formation 5 removably engageable over the front end of the lens 2 for capping the same, a securing portion 6 of flat form extending radially from the capping formation 5 with the plane thereof normal to the axis of the capping formation and provided with an unbroken annular securing formation 7 spaced from the capping formation 5 and having an interior diameter larger than that of the capping formation, and a view finder obstructing formation 8 also of flat form extending radially from the capping formation at an angle to the securing portion 6.

Figure 3:
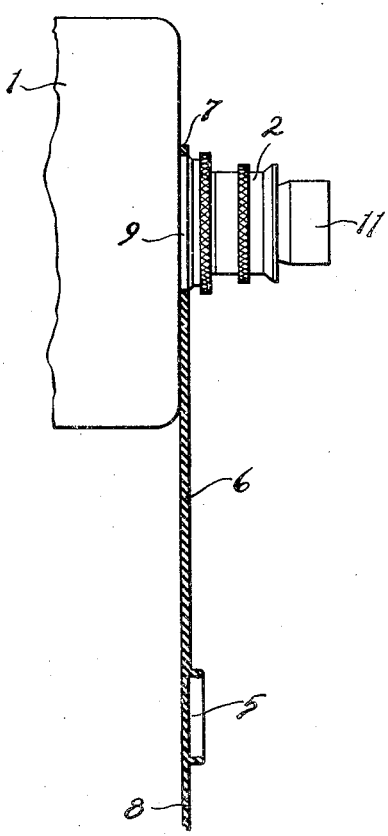
Figure 3 is a view similar to Figure 1 with the lens cap in a different position and in section.
Figure 4:
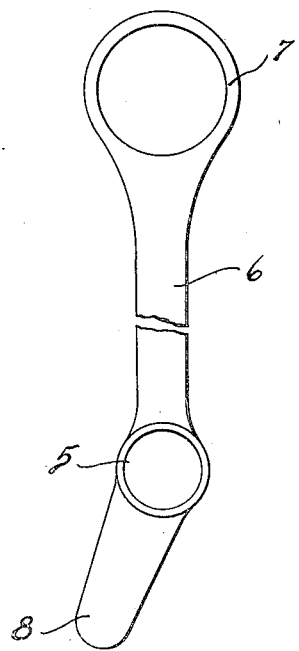
Figure 4 is a rear elevation of the lens cap.

The lens cap is secured with the camera by engaging the securing formation 7 about the lens 2 at an enlarged rear portion 9 thereof spaced rearwardly of the front end of the lens and with the capping formation 5 facing forwardly in the extended or non-capping condition of the lens cap, the internal diameter of the formation 7 being normally smaller than that of the portion 9 of the lens so that it is stretched on the portion 9 to secure it thereon. See Figure 3.

Figure 2:
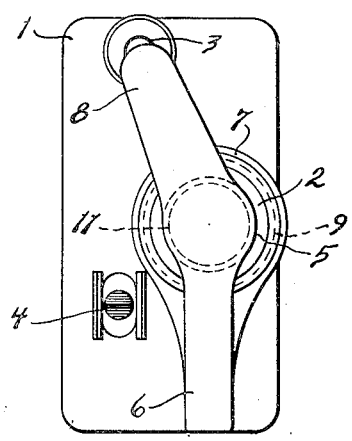
Figure 2 is a front elevation of the same.

When it is desired to cap the lens 2, the lens cap is doubled on itself and the capping formation 5 is frictionally engaged on the relatively small front portion 11 of the lens to cap the same, the flexibility of the securing portion 6 permitting it to be doubled on itself for this purpose. See Figures 1 and 2. When the lens is so capped, the outer end of the view finder obstructing formation 8 is disposed in front of the view finder to indicate to the user that the lens is capped when the user attempts to view through the view finder.

The securing portion 6 being secured with the camera at the lens and the exposure control member 4 being disposed adjacent the lens 2, the securing portion 6 is adapted to be manually engaged as an incident of manual engagement of the camera for exposure to indicate engagement of the capping formation 5 on the lens, thus providing an additional indication with a view toward preventing operation of the camera while the lens is capped.

While I have thus described my invention, I do not wish to be limited to the precise details described as changes may be readily made without departing from the spirit of my invention, but having thus described my invention I claim as new and desire to secure by Letters Patent the following:

1. A lens cap formed of a single piece of lineally elastic material comprising a cup shaped lens capping formation removably engageable over a lens end for capping the same and securing means of flat form extending radially from said capping formation with the plane thereof normal to the axis of said capping formation and provided with an unbroken annular securing portion spaced from said capping portion and having an interior diameter larger than that of said capping formation and adapted for tensioned securing engagement about said lens at a location spaced inwardly of said lens end.

2. A lens cap formed of a single piece of lineally elastic material comprising a cup shaped lens capping formation removably engageable over a photographic lens end of a camera for capping the same, securing means of flat form extending radially from said capping formation with the plane thereof normal to the axis of said capping formation and provided with an unbroken annular securing formation spaced from said capping formation and adapted for tensioned securing engagement about said lens at a location spaced inwardly of said lens end, and an extension projecting radially from said capping formation at an angle to said securing means for obstructing the view finder of the camera.

JOSEPH H. McNABB.